United States Patent
Roberts et al.

(10) Patent No.: US 11,590,410 B2
(45) Date of Patent: Feb. 28, 2023

(54) LINE MARKING DEVICE, A SET WITH A LINE MARKING DEVICE AND A METHOD FOR DEPOSITING MATERIAL ACCORDING TO A PREDETERMINED PATTERN

(71) Applicant: SWOZI AG, Diepoldsau (CH)

(72) Inventors: Peter James Roberts, Wynnum (AU); Aleksander Valdis Velde, Taringa (AU); Donald John Hill, Coorparoo (AU); Brendan Paul McCarthy, Willowbrook, IL (US); Mathias Wäckerlin, Altstätten (CH); Patrick Specker, Altstätten (CH); Mario Hutter, Berneck (CH)

(73) Assignee: SWOZI AG, Diepoldsau (CH)

( * ) Notice: Subject to any disclaimer, the term of this patent is extended or adjusted under 35 U.S.C. 154(b) by 167 days.

(21) Appl. No.: 16/068,526

(22) PCT Filed: Nov. 18, 2016

(86) PCT No.: PCT/EP2016/078095
§ 371 (c)(1),
(2) Date: Jul. 6, 2018

(87) PCT Pub. No.: WO2017/118501
PCT Pub. Date: Jul. 13, 2017

(65) Prior Publication Data
US 2019/0038960 A1 Feb. 7, 2019

(30) Foreign Application Priority Data

Jan. 8, 2016 (EP) ..................................... 16150545

(51) Int. Cl.
*A63C 19/06* (2006.01)
*B05B 12/12* (2006.01)
(Continued)

(52) U.S. Cl.
CPC ............. *A63C 19/065* (2013.01); *B05B 12/12* (2013.01); *B05B 12/34* (2018.02); *B05B 13/005* (2013.01);
(Continued)

(58) Field of Classification Search
CPC ....... B05B 9/0409; B05B 12/34; B05B 12/12; A63C 19/065; A63C 19/06; A63C 19/067;
(Continued)

(56) References Cited

U.S. PATENT DOCUMENTS 6,074,693 A * 6/2000 Manning ................. B05B 12/12
118/697
8,935,057 B2 * 1/2015 Dolinar .............. F16M 11/2028
404/93

(Continued)

FOREIGN PATENT DOCUMENTS

WO 2014/013414 A1 1/2014

OTHER PUBLICATIONS

International Search Report Corresponding to PCT/EP2016/078095 dated Feb. 20, 2017.
(Continued)

*Primary Examiner* — Christopher R Dandridge
(74) *Attorney, Agent, or Firm* — Finch & Maloney PLLC

(57) ABSTRACT

It is suggested to provide a line marking device having a GNSS receiver or prism for a robotic total station. The line marking device further has at least one spray nozzle and a comparator adapted to compare a detected location to a predetermined pattern. The comparator calculates a location and/or a direction error. Further the line marking device has a prompting device for providing steering information to a user. The provided information is the location and/or direction error. The at least one spray nozzle and the GNSS
(Continued)

Figure 1:
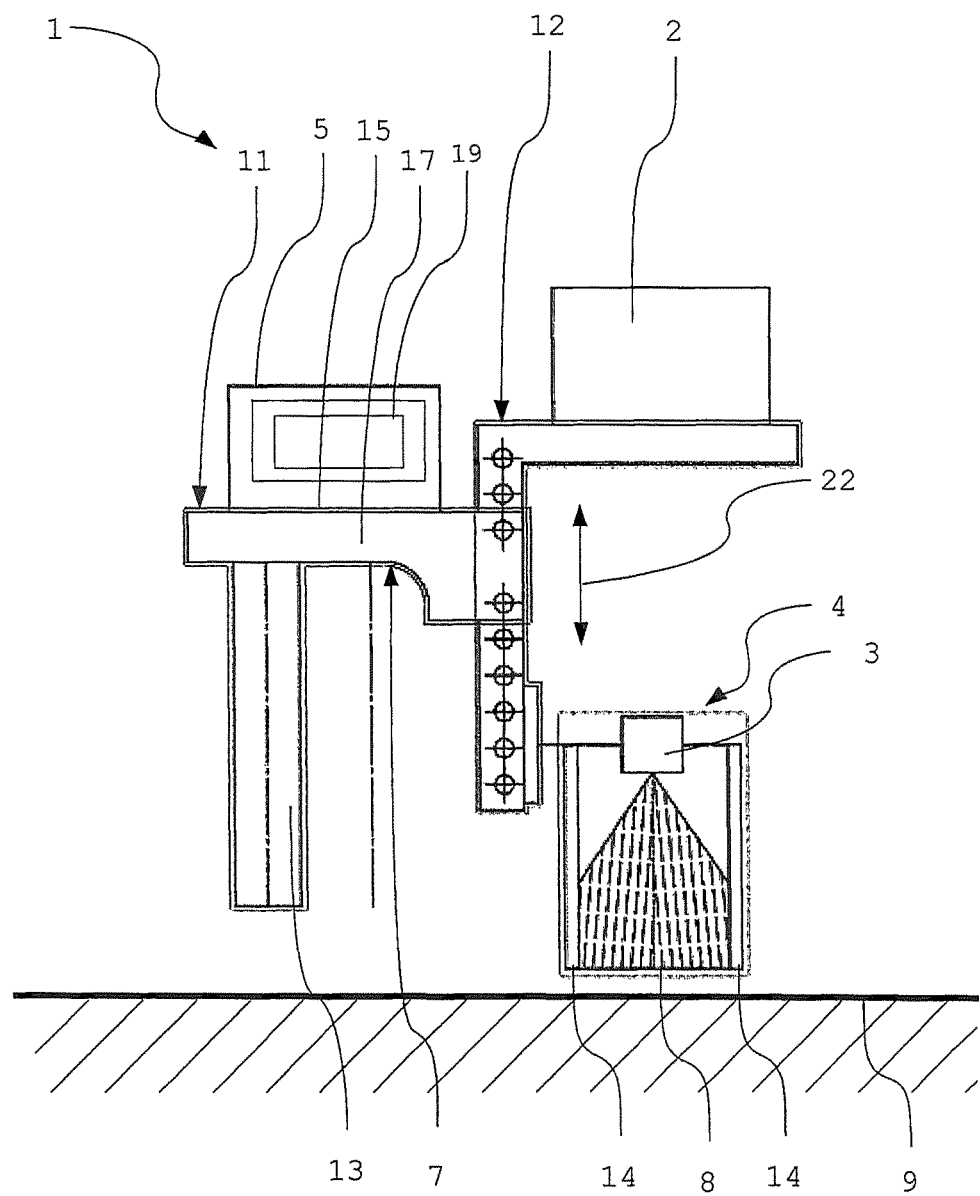

receiver or the prism are in a fixed spatial relation to a connecting element, which is connected or connectable to an unmovable receiving element of a cart.

11 Claims, 3 Drawing Sheets

(51) Int. Cl.
  *G01S 19/14*  (2010.01)
  *B05B 12/34*  (2018.01)
  *E01C 23/16*  (2006.01)
  *E01C 23/22*  (2006.01)
  *B05B 13/00*  (2006.01)

(52) U.S. Cl.
  CPC ............ *E01C 23/163* (2013.01); *E01C 23/22* (2013.01); *G01S 19/14* (2013.01); *A63C 2019/067* (2013.01)

(58) Field of Classification Search
CPC . A63C 19/08; A63C 2019/067; E01C 23/163; E01C 23/22; G01S 19/14
See application file for complete search history.

(56) References Cited

U.S. PATENT DOCUMENTS

| | | | |
|---|---|---|---|
| 9,124,780 B2 * | 9/2015 | Nielsen | ................ B65D 83/203 |
| 2010/0189887 A1 * | 7/2010 | Nielsen | ................... E01C 23/22 |
| | | | 427/136 |
| 2010/0266756 A1 | 10/2010 | Knutson et al. | |
| 2010/0320287 A1 | 12/2010 | Heatley | |
| 2012/0269576 A1 * | 10/2012 | Koch | ................... E01C 23/222 |
| | | | 404/94 |

OTHER PUBLICATIONS

Written Opinion Corresponding to PCT/EP2016/078095 dated Feb. 20, 2017.

* cited by examiner

LINE MARKING DEVICE, A SET WITH A LINE MARKING DEVICE AND A METHOD FOR DEPOSITING MATERIAL ACCORDING TO A PREDETERMINED PATTERN

The present invention relates to a line marking device, a set with a line marking device and a method for depositing material according to a predetermined pattern.

Today, before a sports area can be marked, the exact location of the line pattern has to be found through a survey procedure. Through referencing relative to a known location, e.g. corner pole or a goal post, the marker can extrapolate the field lines by using a measure tape and strings. Sometimes, the marker also uses a TPS system (Theodolite Positioning System) or a GNSS system (Global Navigation Satellite System) to identify the reference points for the lines to draw. Then, supporting means like strings and markers are installed. The purpose of the drawing equipment is to facilitate the marking process and to assure the required accuracy of the line pattern. Once the location spots of the drawings are known, various methods exist to guide a line marking device. Usually, the operator pushes the line marking device along a string between two poles to assure a good quality line. Sometimes, a laser transmitter and receiver are installed at the respective ends of the line to be drawn. Then a laser guided apparatus is pushed along the laser beam in the working area of an actuator. Finally, when the drawing is finished, all supporting means like strings, markers and laser components have to be collected and stored away.

WO2014/013414 A1 shows a line marking apparatus which comprises a body mounted so as to be mobile, line marking head movable relative to the body and means for determining the distance travelled by the apparatus from a determined point. The device of WO2014/013414 A1 is however a complex device which includes expensive devices such as an industry PC and a movable line marking head.

U.S. Pat. No. 6,074,693 shows a global positioning system controlled spray system. The system includes a paint sprayer driver program and a GPS paint sprayer. The GPS paint sprayer includes a GPS receiver. However, the device in U.S. Pat. No. 6,074,693 is complex and expensive, since it requires an external computer, movable positioning arms, a display and a keypad.

The object of the present invention is to overcome the disadvantages of the prior art and in particular to provide a line marking device which is simple to build, versatile and producible at a low cost.

Another object of the invention is to provide a line marking device which is easy to use.

It is suggested to provide a line marking device comprising a GNSS receiver or prism for a robotic total station. The line marking device further comprises at least one spray nozzle and a comparator adapted to compare a detected location to predetermined pattern. The comparator calculates a location and/or a direction error. Further the line marking device comprises a prompting device for providing steering information to a user. The provided information is the location and/or direction error. The at least one spray nozzle and the GNSS receiver or the prism are in a fixed spatial relation to a connecting element, which is connected or connectable to an unmovable receiving element of a cart.

A GNSS receiver may refer to any satellite based positioning system or combination thereof. Examples of such a satellite positioning system are GPS (Global Positioning System), GlONASS, Galileo, BeiDou, GAGAN. In some instances the device may further comprise a fixed GNSS master station or use the signal of a fixed master station which functions as a reference station. This second station would also include GNSS receiver for determining its position.

Alternatively no GNSS master is provided. A reference signal is then provided by an existing GNSS reference station network.

In another alternative, the current position of a line marking device may be determined with a prism for a robotic total station. The term "robotic total station" as used herein refers to any device capable of measuring a distance and an angle to a second object such as a prism.

The GNSS receiver and the at least one nozzle are preferably mounted on a frame.

The comparator receives a position signal from the GNSS receiver. This signal is compared a target position which is included in a predetermined pattern. The difference between target position and GNSS signal is used to calculate the location and/or direction error. The location and/or direction error is then transmitted to the prompting device.

As used herein the term "spray nozzle" is intended to cover devices utilized to deposit any material, in particular, to deposit material to mark a line such as paint, chalk or lime. In some embodiments the device may include more than one nozzle which may be controlled independently.

The prompting device provides steering information to the user. The prompting device may provide the information acoustically or visually. Examples for prompting devices are a light bar or a speaker or a display or any combination thereof.

Visual information can indicate any one or more or all of the following information: current absolute and relative position, current position in reference to a predetermined geo-located pattern, current speed, current direction, steering instructions, orientation of the device and progress or time to complete a task.

In addition or alternative to visual representation with a display any of the above information may be transmitted acoustically. The prompting device can for example emit one sound which indicates a user to steer right and a second sound which indicates a user to steer left.

Another option which may be installed additionally or alternatively to transmit the above information to a user is a light bar.

The at least one spray nozzle and the GNSS receiver are in a fixed spatial relation to a connecting element, which is connected or connectable to an unmovable receiving element of a cart. Hence, any property of the line drawn is determined by the steering of a user. The user may steer the device by pushing the cart in a provided direction. The user may adjust the direction according to the steering information. Hence, a device with few moving parts which is robust, versatile and can be produced at a low cost is provided.

Preferably, the prompting device is a display. The display and the at least one spray nozzle may be arranged such that during intended use at least one spray nozzle and prompting device are simultaneously observable by the user.

The at least one spray nozzle and the display may be optically simultaneously observable when they are positioned in close proximity. Preferably the distance between nozzle and display is smaller than 0.6 meters, particularly preferred smaller than 0.4 meters, especially smaller than 0.2 meters.

As a result a user may observe the display and the nozzle at the same time. In some cases there may be an older line which is redrawn. In such cases the user may also observe the older line.

Preferably, a line marking device is removably attachable to cart via a connecting element.

Thereby, the line marking device may be transferred from one cart to another. The line marking device may be bought and sold separately from the cart as individual unit.

Preferably, the line marking device includes a socket for a mobile computing device and a communication interface for the mobile computing device.

The interface for a mobile computing device allows the user to connect any mobile computing device such as a smartphone to the line marking device. Said mobile computing device may act as a prompting device and/or a comparator. The interface may connect the mobile computing device with a wire connection or wirelessly.

Preferably, the GNSS receiver is arranged vertically above at least one spray nozzle without horizontal deviation.

The GNSS receiver may obtain a position which is not identical with the position of the spray nozzle. A position of the spray nozzle is then obtained by adding the relative distance from GNSS receiver to the nozzle combined the orientation of the cart to the GNSS signal. If, however, the receiver is positioned vertically above the spray nozzle during intended use of the spray nozzle without horizontal deviation, the coordinates of the GNSS receiver are identical to the coordinates the spray nozzle. Thereby, the position obtained by the GNSS receiver does not need to be corrected.

Preferably, the line marking device includes at least one orientation sensor.

The at least one orientation sensor may be for example a gyroscope or an inertial motion unit (IMU). The at least one orientation sensor may be connected or connectable to the comparator and sends a signal with its orientation to the comparator. The comparator may then use the signal to calculate a position and orientation of the cart. Thereby more precise steering information may be obtained.

Preferably, the device includes an imaging sensor.

The imaging sensor may be connected to the comparator. The comparator may detect preset locations with the signals received from the imaging sensor. Further the imaging sensor may be connected directly or indirectly to the prompting device. Additionally the comparator may inform a user via the prompting device that a preset location is detected. The prompting device may display the signal of the imaging sensor. Examples of such an imaging sensor are a scanner, a camera, an ultrasonic sensor, radio sensor and infrared sensor. The imaging sensor may detect preset locations, such as goal posts or holes for corner poles, or corner poles.

Another aspect of the invention includes a set of a line marking device and a cart.

Typically the cart is a line marking cart. The cart may also be a tractor, a riding mower, a golf cart or any wheeled vehicle suitable for marking a line.

A position of the at least one spray nozzle in relation to the cart may be freely chosen. The nozzle may be arranged between moving elements of the cart. Alternatively or additionally the nozzle may be arranged besides a pair of moving elements. A "moving element" as used herein includes elements for movement of the cart like wheels or tracks.

Preferably, the cart of the set is adapted to be pushed and/or steered manually.

The pushing may be supported by a wheel hub motor, a fuel engine, like bike motor or similar motors. Similarly, the steering may be supported by a steering booster.

Preferably, the line marking device is retained on one mounting point of the cart.

Thereby, a simple and fast connection is established between the cart and the line marking device.

The invention further relates to a method for depositing a material according to a predetermined pattern with a line marking device. The method comprises the following steps: A position of a spray nozzle is determined with a GNSS sensor. A spray nozzle and the GNSS sensor are in a fixed spatial relationship to a connecting element, which is connected or connectable to an unmovable receiving element of a cart. Data is received which comprises a predetermined pattern for marking. The pattern is compared to a measured position. Steering information is provided to a user with the prompting device. Material is deposited with the spray nozzle.

Preferably, the method includes the step of communicating with a mobile device via an interface.

The interface for a mobile computing device allows the user to connect any mobile computing device such as a smartphone to the line marking device. Said mobile computing device may act as a prompting device and/or a comparator. The interface may connect the mobile computing device with a wire connection or wirelessly.

Preferably, the mobile computing device is held by a socket. The socket allows a fixation, preferably a removable fixation of the mobile computing device.

Preferably, an orientation of the cart is provided by at least one orientation sensor.

The at least one orientation sensor may be for example a gyroscope or an inertial motion unit (IMU). The at least one orientation sensor may be connected or connectable to the comparator and sends a signal with its orientation to the comparator. Thereby more precise steering information may be obtained.

Preferably, a predetermined position is detected with an imaging sensor.

The imaging sensor may be connected to the comparator. The comparator may detect preset locations with the signals received from the imaging sensor. Further the imaging sensor may be connected directly or indirectly to the prompting device. The prompting device may alert a user Examples of such an imaging sensor are a scanner, a camera, an ultrasonic sensor, radio sensor and infrared sensor. The imaging sensor may detect locations, such as goal posts or holes for corner poles, or corner poles.

Preferably, the device is pushed and/or steered manually.

The pushing may be supported by a wheel hub motor, a fuel engine, like bike motor or similar motors. Similarly, the steering may be supported by a steering booster.

The method for depositing a material may be carried in the following fashion:

A user can provide a predetermined pattern. The patterns may be chosen from a set of patterns stored on the mobile computing device. Alternatively the patterns may be created elsewhere and transferred to the mobile computing device or created on the mobile computing device. After a pattern is provided, the pattern is georeferenced to a playing field: A location of the device is determined with its GNSS receiver or prism in relation to the GNSS master or robotic total station which is in a fixed location. In an alternative embodiment no GNSS master is provided. A reference signal is then provided by an existing GNSS reference station network.

The predetermined pattern with its physical dimensions may be fitted to a surveyed playing field. The survey of the playing field may be performed with the same device. During the survey procedure the device can be pushed to reference point(s) like the corners of an existing marking and their locations are stored. Usually the dimensions of playing fields marked with, for example, tape and string and the like do not match exactly with the required dimensions and predetermined patterns. It is however not desirable to have multiple markings on the same field. Hence, the predetermined pattern may be geo-referenced to the existing imprecise markings. As a result, the freshly drawn lines match the existing lines which were drawn earlier.

In a similar manner the pattern can alternatively be referenced to existing structures like goals or corner poles. In a survey procedure the device may be brought to the goal posts and corner poles of a football field and their locations are saved. The location may be marked manually by a user or detected automatically by an imaging sensor detecting the structure, for example the hole for a corner pole. The predetermined pattern is then altered to fit the existing structures.

Locations of existing structures lines can be stored and reutilized when the field is remarked after any given time. Thus, the survey procedure only needs to be conducted once. For remarking the data from the survey may be loaded and the field can be marked.

Naturally, the pattern can also be applied unaltered and/or to an unsurveyed field. In these cases the predetermined pattern is geo-referenced to the field by choosing an orientation and a reference point and then the marking material is directly applied.

After geo-referencing the predetermined pattern to a playing field the marking of the field may start. Usually a material to deposit like a paint, chalk or lime is stored on a cart. The material may be transported to the nozzle with a pump. Plates at a nozzle may be set to a desired line thickness, e.g. for football 12 cm.

Before the marking starts, the prompting device, preferably the display, may guide the user to a starting location where marking starts. Then while marking the line the prompting device may emit audio and/or visual signals to guide a user. The display may also display a virtual line along which the user is guided.

Parking lots, designated areas in a construction site or similar sites may be marked with a device as described.

Figure 2:
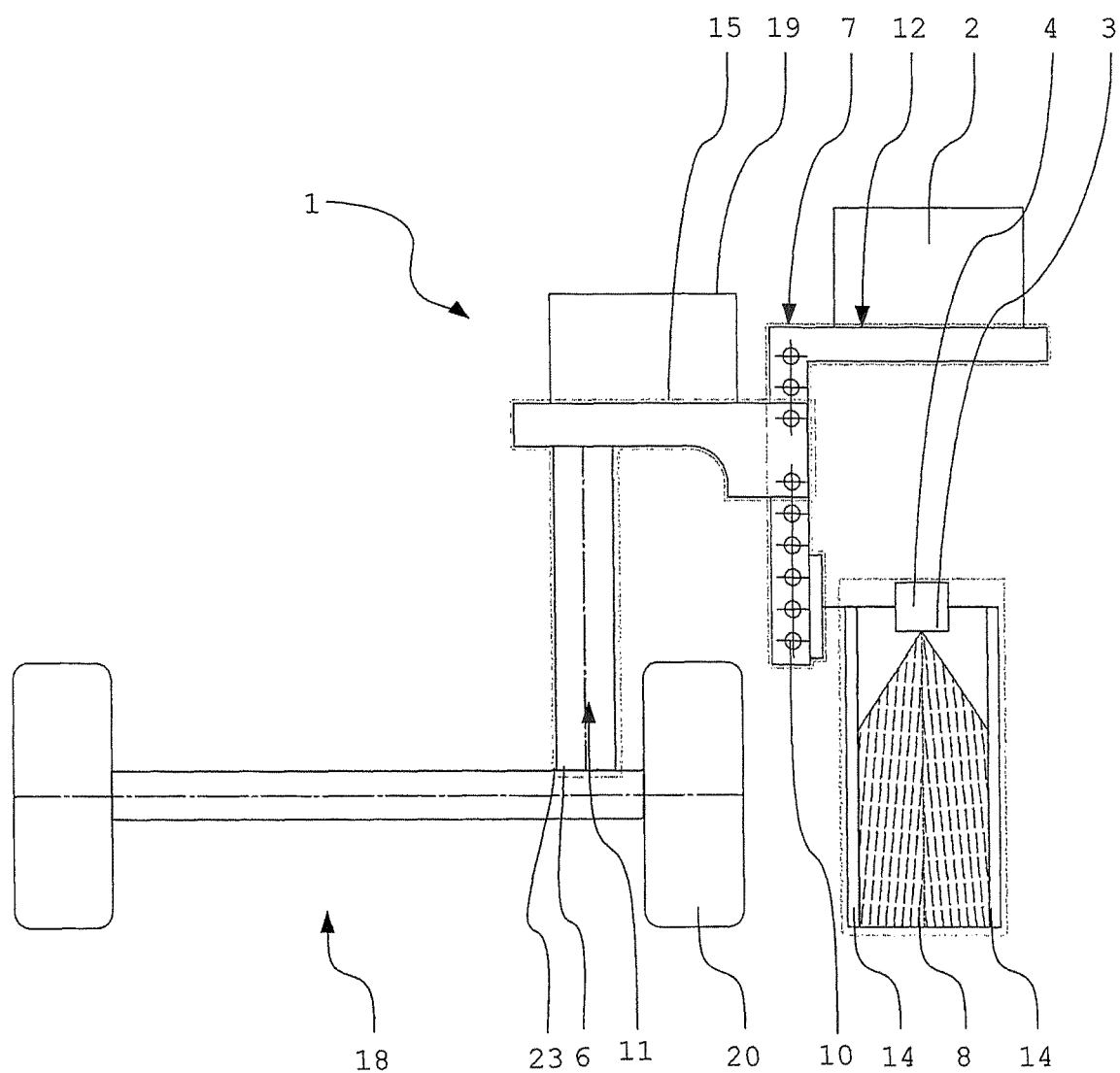
Figure 3:
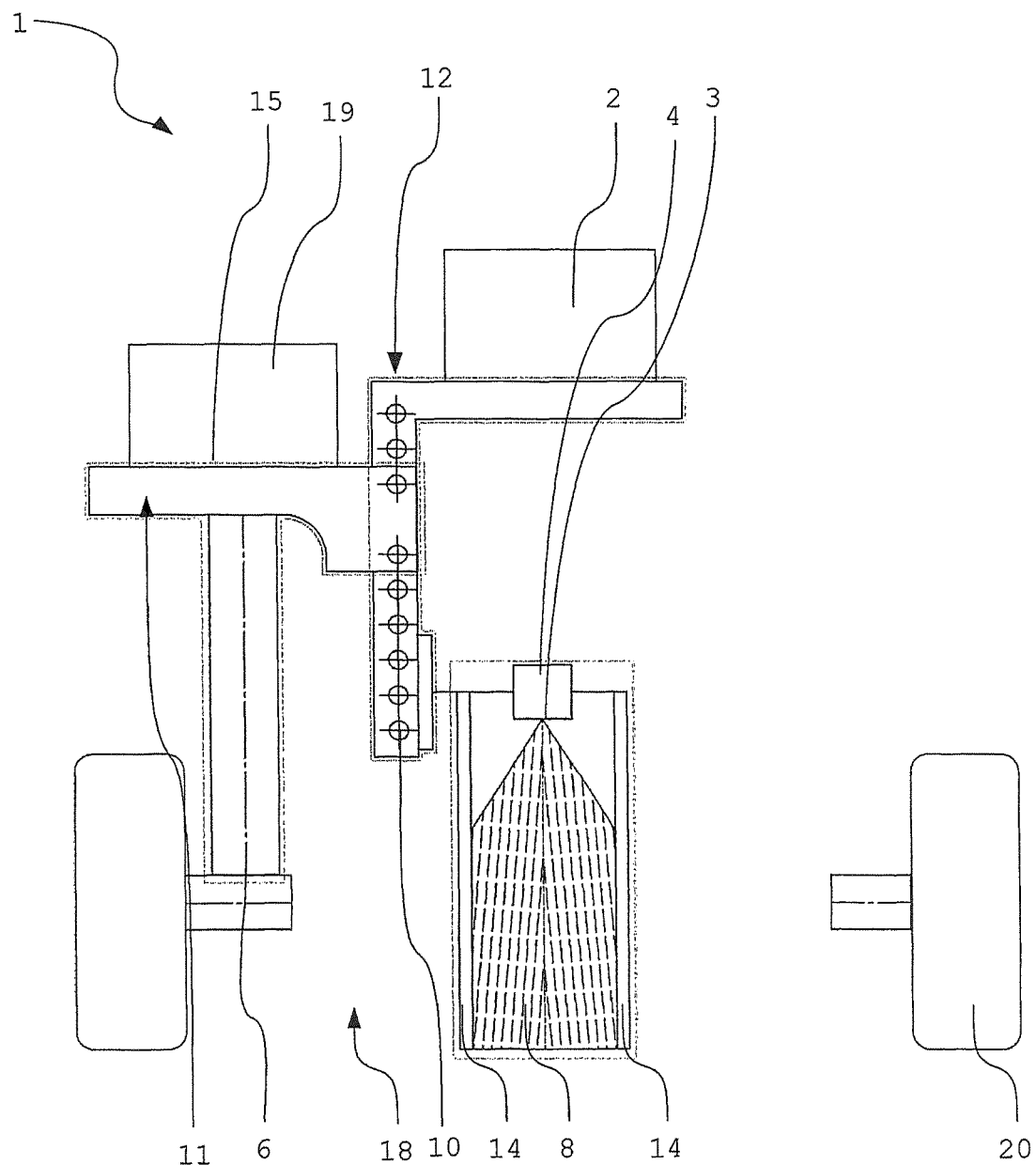

Non-limiting embodiments of the invention are described, by way of example only, with respect to the accompanying drawings, in which:

FIG. 1: is a schematic view of a line marking device
FIG. 2: is a schematic view of a line marking device mounted on a cart
FIG. 3: is a schematic view of a line marking device mounted on a cart in an alternate configuration.

FIG. 1 shows a schematic view of a line marking device 1. The line marking device includes a GNSS (global navigation satellite system) receiver 2, a spray head 4 and a socket 15 for a prompting device 5. GNSS receiver 2, spray head 4 and socket 15 are held by a frame 7.

The frame 7 includes two pieces. The first frame piece 11 includes two parts: a bar 13 and a beam 17. The bar 13 connects the device mechanically as a connecting element to a cart or wagon (see FIGS. 2 and 3). The beam 17 includes the socket 15. In the socket 15 a prompting device 5 is held. The prompting device 5 may be a mobile computing device such as a smartphone or tablet. Alternatively, the prompting device may be a light bar. Further the beam 17 is connected to second frame piece 12. The second frame piece 12 holds the GNSS receiver 2 and the spray head 4. GNSS receiver 2 and spray head 4 are adjustable in an upper or lower direction 22. The adjustability allows setting a distance between spray head 4 and a field 9. All pieces of the frame 7 are fixed in their position.

A comparator receives a position signal from the GNSS receiver 2. This signal is compared a target position which is included in a predetermined pattern. The difference between target position and GNSS signal is used to calculate the location and/or direction error. The location and/or direction error is then transmitted to the prompting device.

The spray head 4 comprises a spray nozzle 3 and two screens 14. The spray nozzle deposits a material 8 like paint, lime or chalk to the field 9. The distance between the screens is adjustable. Hence, the width of a line which is drawn may be defined. The spray head 4 is fixed to the second frame piece 12.

The prompting device 5 signals steering information to a user. One option to signal the steering information to the user is through a mobile computing device such as a smartphone with a display 19. The display 19 can show an optical signal such as move right or move left or indicate a distance by which the device is off track.

The display 19 can further indicates any one or more or all of the following information: current absolute and relative position, current position in reference to a predetermined geo-located pattern, current speed, current direction, steering instructions, orientation of the device and progress or time to complete a task.

A position of the device is calculated with the GNSS receiver 2. In the shown configuration the GNSS receiver 2 is in a fixed spatial relationship to the spray head. Even further the GNSS receiver is arranged vertically above the spray head without horizontal deviation. In a 2-dimensional coordinate system such as GPS coordinates their position is identical.

A position of the line marking device is determined with the receiver 2 and a stationary master unit (not shown) which also includes a GNSS receiver and is mounted in a fixed location. The coordinates of the fixed location may be known.

A distance and direction from the master unit to the antenna is calculated with a GNSS algorithm. This 3-dimensional distance vector may be expressed in in spherical coordinates as length, heading angle (azimuth angle relative to North) and pitch angle (elevation). The GNSS algorithm to calculate to position of the receiver 2 in relation to the master unit uses real time kinematics (RTK).

In addition to the cart's 3D-position relative to the master, its absolute orientation in space, i.e. one or all of the three orientation angles yaw, pitch and roll is/are determined. For the purpose of this invention the roll angle is defined as a rotation around an axis along a direction in which the cart is moving. Pitch is a rotation along an axis which points perpendicular to the roll axis and parallel to the ground. The yaw rotates around an axis orthogonal to the ground.

While the yaw must be known for painting a curved line, the main reason to know pitch and roll is that most sport fields are not perfect planes, but have local bumps and holes which can cause a cart 18 to tilt.

The tilt angles with horizontal rotation axis (roll and pitch) can be obtained from built-in tilt sensors of modern GNSS antenna, the azimuth angle (yaw) with vertical rotation axis can be obtained by observing the change of the heading angle when moving the mobile. In case of line marking where the mobile is moved with a speed of about 1-2 m/s, a read out frequency of 10-20 Hz of the heading angle is sufficient. If a higher precision is required, a separate IMU (Inertial Motion Units) with gyroscopes and accelerations sensors and/or a north-finding compass should be used, a well-known solution for navigation purposes with fast moving objects. To obtain velocity and position data from IMU devices, their measurement signals must be integrated and the needed integration constants can be delivered by the GNSS unit. Also a drift of the IMU sensors is corrected by a regular referencing of the IMU position signals with GNSS signals.

The GNSS receiver or the GNSS master unit includes an interface to communicate with the prompting device 5. The interface may connect the comparator with a wire connection or wirelessly. Examples of a wireless connection are any electromagnetic waves, like a Bluetooth connection.

FIG. 2 shows a schematic view of a line marking 1 device mounted on a standard cart 18. The line marking device is connected to the cart with the first frame piece 11 as connection element. The frame piece 11 is mounted on the cart 18 at a single point 6 and fixed to a receiving element 23 on the cart 18. The receiving element 23 does not move relative to the cart 18.

The frame piece may be connected to the cart via a screw connection.

The cart 18 is connected to the device 1 and a mounting point 6 which is located on the free end of bar 13. Because the distance between ground and mounting point 6 may depend on the cart 18, the height of nozzle 3 needs be adjusted. When the frame 7 is mounted, the vertical position of the nozzle is set. The position is set by adjusting the vertical position of the second frame piece 12 with bores 10. The final position of the second piece 12 is determined by the distance of the spray nozzle to the ground.

One possible application of the device mounted on a cart shown in FIG. 2 is marking a football field. Of course similar playing fields for American football, baseball, cricket or similar may also be marked.

In a first step a user provides a predetermined pattern. This pattern is chosen from a set of patterns stored on the mobile computing device. After the pattern is provided, the pattern is georeferenced to a playing field 9: A location of the device 1 is determined with its GNSS receiver 2 in relation to the GNSS master which is in a fixed location.

The predetermined pattern with its physical dimensions is fitted to a surveyed playing field. The survey of the playing field is performed with the same device. During the survey procedure the device is pushed to the corners of an existing marking and the corner's locations are stored. Usually the dimensions of playing fields marked with, for example, tape and string and the like do not match exactly with the required dimensions and predetermined patterns. Hence, the predetermined pattern is geo-referenced to the existing imprecise markings and adapted in its dimensions.

The locations of the corners are stored and reutilized when the field is remarked after any given time.

After geo-referencing the predetermined pattern to a playing field the marking of the field starts. Lime, which is a material to deposit 8, is stored on the cart 18. The material is transported to the nozzle 3 with a pump. The plates 14 are set to the desired line thickness, e.g. for football 12 cm.

Before the marking starts, the prompting device 5 guides the user to a starting location where marking starts. Then while marking line the prompting device emits audio and visual signals to guide a user. The display also displays a virtual line along which the user is guided.

FIG. 3 shows a schematic view of a line marking device mounted on a cart in an alternate configuration. In FIG. 2 the device is mounted on a side of the cart and extends eccentrically. In FIG. 3 the device is mounted on the side of the cart as well but extends to the middle of the cart. The nozzle 3 is thus positioned in between the moving elements 20.

If the device is mounted in the middle of the cart, the green-keeper is on the same line as the line he is painting. On the other hand, the person walks unergonomically to avoid stepping onto the wet line.

The invention claimed is:

1. A set comprising a line marking device and a manually pushed and steered cart, wherein the line marking device is retained on at least one mounting point of the cart,
   the cart comprising an unmovable receiving element,
   the line marking device comprising:
   either a GNSS receiver or a prism for a robotic total station,
   at least one spray nozzle,
   a comparator adapted to compare a detected location to a predetermined pattern and calculate at least one of a location error and a direction error,
   a prompting device for providing steering information to a user,
   wherein the provided information is the at least one of the location and the direction error and the provided information is used to manually steer the device by the user,
   wherein the prompting device is a display that displays a virtual line along which the user is guided,
   wherein either the at least one spray nozzle, the GNSS receiver or the prism are in a fixed spatial relation to a connecting element, wherein the connecting element is connected to the unmovable receiving element of the cart and wherein the line marking device comprises a frame, wherein the frame includes a first frame piece having a bar as the connecting element and a beam which is connected to a second frame piece, wherein the GNSS receiver and the at least one spray nozzle are mounted on the frame, wherein all pieces of the frame are fixed in their position and the at least one spray nozzle and the display are optically simultaneously observable and the distance between the nozzle and the display is smaller than 0.6 meters.

2. The set according to claim 1, wherein the prompting device is a display and that the at least one spray nozzle and the display are arranged such that during intended use the at least one spray nozzle and the prompting device are simultaneously observable by a user.

3. The set according to claim 1, wherein the line marking device comprises a socket for a mobile computing device and a communication interface for the mobile computing device.

4. The set according to claim 1, wherein during intended use the GNSS receiver is arranged vertically above the at least one spray nozzle without horizontal deviation.

5. The set according to claim 1, wherein the line marking device includes at least one orientation sensor.

6. The set according to claim 1, wherein the line marking device includes an imaging sensor.

7. A method for depositing a material according to a predetermined pattern with a set according to claim 1 comprising the steps of:
   determining a position of at least one spray nozzle with a GNSS sensor, wherein the spray nozzle and the GNSS sensor are in a fixed spatial relation to a connecting element, which is either connected or connectable to an unmovable receiving element of a manually pushed and steered cart,
   receiving data with the predetermined pattern for marking,
   comparing the pattern to a measured position,
   providing steering information with a prompting device to a user, manually steering the device by the user using the provided information, and depositing material with the spray nozzle.

8. The method for depositing a material according to claim 7, further comprising:

communicating with a mobile computing device via an interface.

9. The method for depositing a material according to claim 8, wherein:

the mobile computing device is held by a socket.

10. The method for depositing a material according to claim 7, further comprising:

providing an orientation of the cart with at least one orientation sensor.

11. The method for depositing a material according to claim 7, further comprising:

detecting a predetermined position with an imaging sensor.

* * * * *